No. 817,268. PATENTED APR. 10, 1906.
A. E. NORRIS.
HOISTING DRUM.
APPLICATION FILED JAN. 31, 1906.

2 SHEETS—SHEET 1.

Witnesses
W. C. Lunsford
Walter N. Trott

Inventor:
Almon E. Norris,
by Crosby & Gregory
Attys.

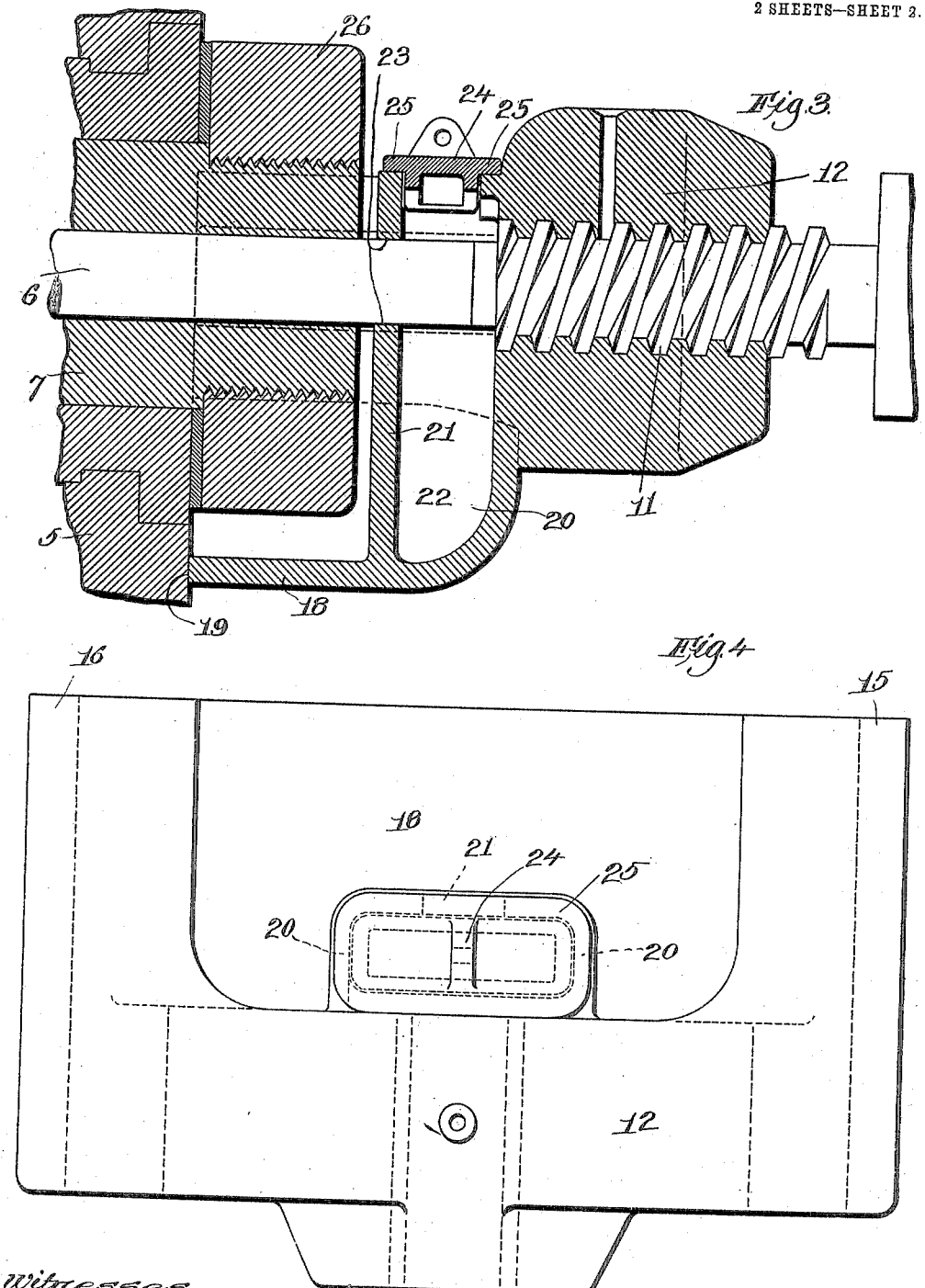

UNITED STATES PATENT OFFICE.

ALMON E. NORRIS, OF CAMBRIDGE, MASSACHUSETTS.

HOISTING-DRUM.

No. 817,268.        Specification of Letters Patent.        Patented April 10, 1906.

Application filed January 31, 1906. Serial No. 298,734.

*To all whom it may concern:*

Be it known that I, ALMON E. NORRIS, a citizen of the United States, and a resident of Cambridge, in the county of Middlesex and State of Massachusetts, have invented an Improvement in Hoisting-Drums, of which the following description, in connection with the accompanying drawings, is a specification, like figures on the drawings representing like parts.

This invention relates to hoisting-drums, and especially to the means for furnishing the necessary lubrication between the thrust-pin for operating the clutch and the clutch-operting screw.

I will first describe one embodiment of my invention and then point out the novel features thereof in the appended claims.

Figure 1:
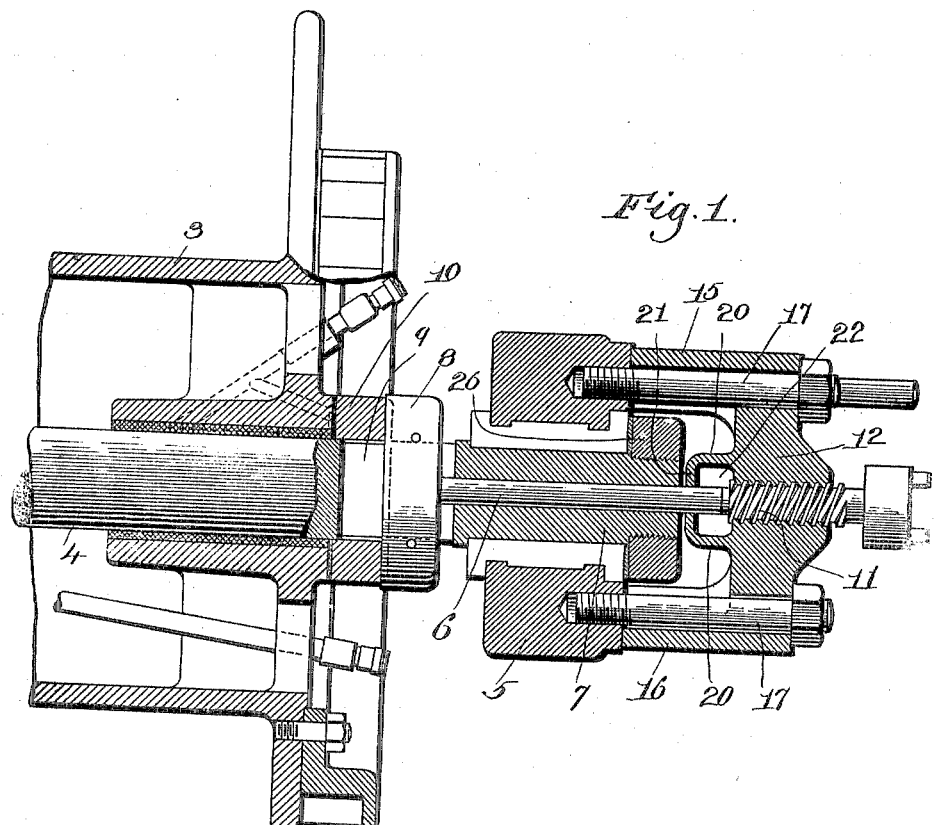
Figure 2:
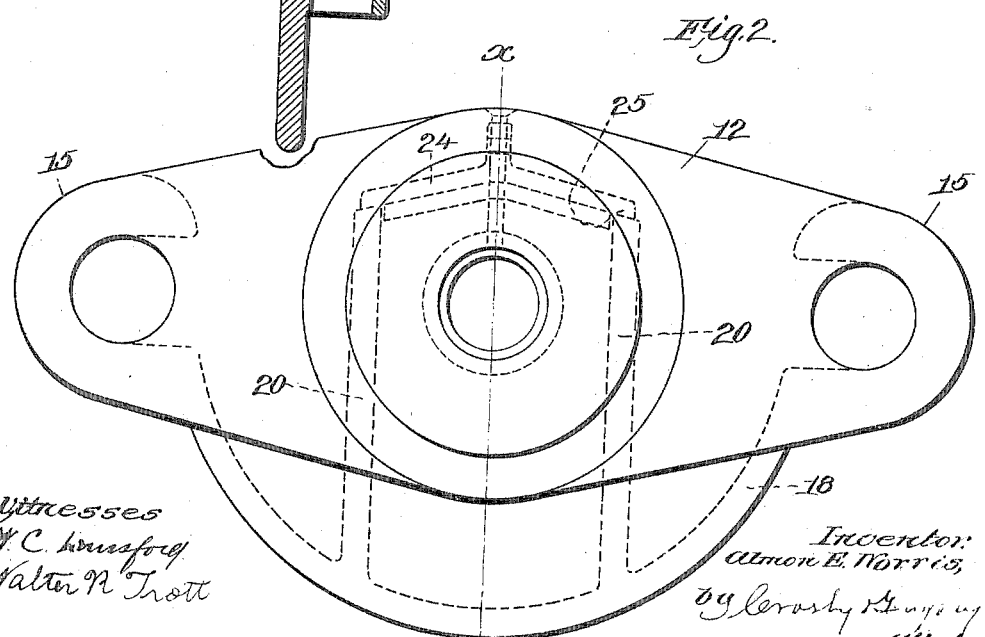

In the drawings, Figure 1 is a horizontal section through one of the bearings of a hoisting-drum, showing my improved method of lubricating the thrust-pin. Fig. 2 is an enlarged end view of the member for supporting the clutch-operating screw. Fig. 3 is a section on the line *x x*, Fig. 2; and Fig. 4 is a top plan view of Fig. 2.

3 designates the hoisting-drum, which may be of any suitable or usual construction and which is shown as mounted on the shaft 4, that is supported at one end in suitable bearings 5. These drums are usually loosely mounted on the shaft 4 and are clutched thereto by moving them longitudinally thereof to bring coacting clutch-surfaces (not shown) on the shaft and drum into engagement. As herein shown, this necessary longitudinal movement of the drum is effected by a thrust-pin 6, which is axially mounted in the end 7 of the shaft 4, one end of which thrust-pin engages the clutch-operating screw 11 and the other end or which engages a cross-piece 8, mounted in a slot 9 of the shaft 4 and having its ends in engagement either with the hub of the drum 3 or the collar 10. The clutch-operating screw 11 is mounted in a fixed bearing 12 and may be turned by means of a lever, as usual. The turning of this screw in one direction moves the thrust-pin 6 to the left, Fig. 1, thereby causing the drum to be clutched to the shaft 4.

The parts thus far described are or may be of any usual or suitable construction and form no part of my present invention, which relates solely to the means for furnishing the necessary lubrication between the end of the thrust-pin and the clutch-operating screw 11 for the purpose of preventing the thrust-pin or the screw from becoming overheated.

The bearing 12 is provided with two arms 15 and 16, which extend forward and rest against the bearing 5 for the shaft 4, said arms being provided with apertures through which stud-bolts 17 pass for securing the screw-bearing 12 to the shaft-bearing 5. These arms are preferably connected by a forwardly-extending web or flange 18, the edge 19 of which meets and engages the side face of the shaft-bearing 5, as best seen in Fig. 3. Extending upwardly from the web or flange 18 are two separated longitudinal walls 20 and a transverse wall 21, which connects the two walls 20 and forms with them and the bearings 12 a chamber 22 for the reception of a suitable lubricating compound. The walls 20 and 21 extend just above the level of the thrust-pin 6, and the wall 21 is provided with an aperture 23 of a size to fit the thrust-pin and through which the thrust-pin passes. The lubricant-containing chamber 22 therefore extends just above the thrust-pin and the screw 11, and its open upper end may be covered by a suitable cap or cover 24, which is herein shown as having flanges 25, which rest on the top of the walls 20 and 21. The chamber 22, it will be noted, does not extend the full width of the head 12, and its dimension in the direction of the length of the thrust-pin is only sufficient to accommodate the longitudinal movement of the thrust-pin and the screw during the operation of the clutch. The transverse wall 21 of said chamber is exterior to the usual collar 26, which is placed on the end of the shaft 4. Since the thrust-pin 6 is cylindrical, a tight joint between said pin and the wall 21 of the lubricant-containing chamber may readily be made.

One advantage of my improved structure is that the lubricant-containing chamber is only deep enough to fairly inclose the end of the thrust-pin 6 and the end of the screw 11, and therefore said pin and screw are readily accessible by merely removing the cover 24, and by making the web or flange 18 parti-cylindrical, as shown, and extending it clear to the bearing 5 said web or flange serves as a brace for the bearing 12 of the screw.

Having fully described my invention, what

I claim as new, and desire to secure by Letters Patent, is—

1. In a hoisting-drum, a shaft-bearing, a shaft rotatable therein, a screw-bearing supported by the shaft-bearing, said screw-bearing having forwardly-extending arms to engage the shaft-bearing, a web or flange connecting said arms and extending forwardly into engagement with the side of the shaft-bearing, and vertical walls rising from said flange and forming a lubricant-containing chamber.

2. In a device of the class described, a shaft-bearing, a shaft therein having a collar thereon outside of said bearing, a screw-bearing supported by the shaft-bearing, said screw-bearing having forwardly-extending arms to engage the shaft-bearing, a parti-cylindrical web or flange connecting said arms and extending forwardly into engagement with the side face of the shaft-bearing, and two longitudinal walls and a transverse wall rising from said flange and forming between them a lubricant-containing chamber, said transverse wall having an aperture for the thrust-pin and being situated beyond the collar on the shaft.

3. In a device of the class described, a shaft-bearing, a shaft therein having a collar thereon outside of said bearing, a screw-bearing supported by the shaft-bearing, and a screw extending through the screw-bearing and adapted to engage a thrust-pin in the end of the shaft, said screw-bearing having formed integral therewith a lubricant-containing chamber situated on the inner side of the screw-bearing but located exterior to the collar on the shaft, one wall of said chamber containing an aperture through which the thrust-pin projects.

In testimony whereof I have signed my name to this specification in the presence of two subscribing witnesses.

ALMON E. NORRIS.

Witnesses:
LOUIS C. SMITH,
MARGARET A. DUNN.